United States Patent [19]

Osterday

[11] 4,028,950

[45] June 14, 1977

[54] DEPRESSED PARKING LINKAGE FOR WINDSHIELD WIPER MECHANISMS

[75] Inventor: John R. Osterday, Dayton, Ohio

[73] Assignee: General Motors Corporation, Detroit, Mich.

[22] Filed: Jan. 28, 1976

[21] Appl. No.: 652,908

[52] U.S. Cl. .................... 74/70; 15/250.16
[51] Int. Cl.² .......................... F16H 21/40
[58] Field of Search .......... 403/322, 324; 74/70; 15/250.16, 250.17

[56] References Cited

UNITED STATES PATENTS

| | | | |
|---|---|---|---|
| 670,238 | 3/1901 | Kingston | 403/322 |
| 727,548 | 5/1903 | Yalley et al. | 403/322 |
| 2,319,408 | 5/1943 | Korte et al. | 15/250.16 |
| 2,544,132 | 3/1951 | Bua | 403/322 |
| 2,836,841 | 6/1958 | Oishei et al. | 15/250.16 |
| 3,688,333 | 9/1972 | Cimino et al. | 15/250.16 |

FOREIGN PATENTS OR APPLICATIONS 956,140  7/1949  France ................ 15/250.16

Primary Examiner—Allan D. Herrmann
Assistant Examiner—Wesley S. Ratliff, Jr.
Attorney, Agent, or Firm—D. F. Scherer

[57] ABSTRACT

A windshield wiper mechanism in which a depressed park control linkage is disposed between the transmission drive link and the wiper drive shaft. The park control linkage is controlled by a solenoid and pin which maintains one angular relation between the linkage members during wiper operation and permits movement of the linkage, by the force on the transmission drive link, to another angular relation for parking the wipers out of the operator's vision. The park linkage is a unit separate from the power mechanism, i.e., electric motor and gear reduction, and the transmission links, so that different park angles can be accommodated for different vehicles by merely changing the park linkage while the remaining structure of the mechanism is unchanged.

3 Claims, 4 Drawing Figures

DEPRESSED PARKING LINKAGE FOR WINDSHIELD WIPER MECHANISMS

This invention relates to windshield wiper mechanisms and more particularly to wiper mechanisms having a depressed park position.

Prior art windshield wiper mechanisms having a depressed park position generally incorporate the park mechanism in the power drive mechanism. These park mechanisms are usually disposed between the rotary input, i.e., electric motor shaft, and the rotary or oscillatory output, i.e., output crank arm. The depressed park position in most instances is accomplished by either changing the throw of the output crank, or by effectively lengthening a link disposed between the rotary input and output crank of the power drive mechanism.

The present invention separates the depressed park mechanism from the power drive mechanism, and positions the park mechanism at the wiper drive shaft which is remotely located from the power mechanism and drivingly connected thereto by a conventional transmission link or rod. With the present invention, a conventional nondepressed park power drive mechanism can be used. Since some vehicles use nondepressed wiper systems, the use of different power mechanisms for different vehicles can be eliminated.

It is an object of this invention to provide an improved depressed park control linkage for use in a windshield wiper mechanism.

Another object of this invention is to provide an improved depressed park control linkage wherein the arcuate sweep of a wiper drive shaft is controlled by a linkage driven by the wiper transmission link and wherein the linkage is selectively controlled to permit an angular relation change between the transmission link and the wiper drive shaft to accommodate parking.

Another object of this invention is to provide in a windshield wiper mechanism an improved depressed park control linkage having a drive link secured to the wiper drive shaft, an idler link rotatably supported on the drive shaft and a control link pivotally connected to the idler link and being selectively connected to the drive link to maintain one relative angular relation between the links during wiping operation and another angular relation during parking.

These and other objects and advantages of the present invention will be more apparent from the following description and drawings, in which.

Figure 1:
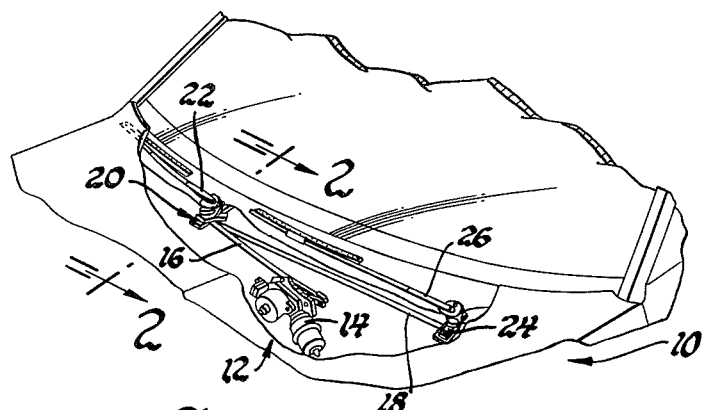
FIG. 1 is a fragmentary perspective view of a windshield wiper mechanism on a vehicle.

Referring to the drawings there is shown in FIG. 1 a partial view of a vehicle 10 on which is mounted a windshield wiper drive mechanism 12 including a power mechanism 14, a first transmission link 16 and a second transmission link 18. The transmission link 16 is connected through a park linkage 20 to a windshield wiper arm 22. The transmission link 18 is connected through a park linkage 24 to a wiper arm 26. The park linkages 20 and 24 are identical and a further description of this component will be limited to the description of the park linkage 20. The windshield wipers are shown in the depressed park position in FIG. 1. That is, the windshield wipers are off the glass surface out of the vision of the operator. The drive mechanism 14 may be comprised of any of the conventional type worm gear or reduction gear drive mechanism in which a rotary input is reduced in speed and converted to a rotary or oscillating output such that the transmission link 16 is moved substantially linearly to and fro during energization of the wiper system.

Figure 2:
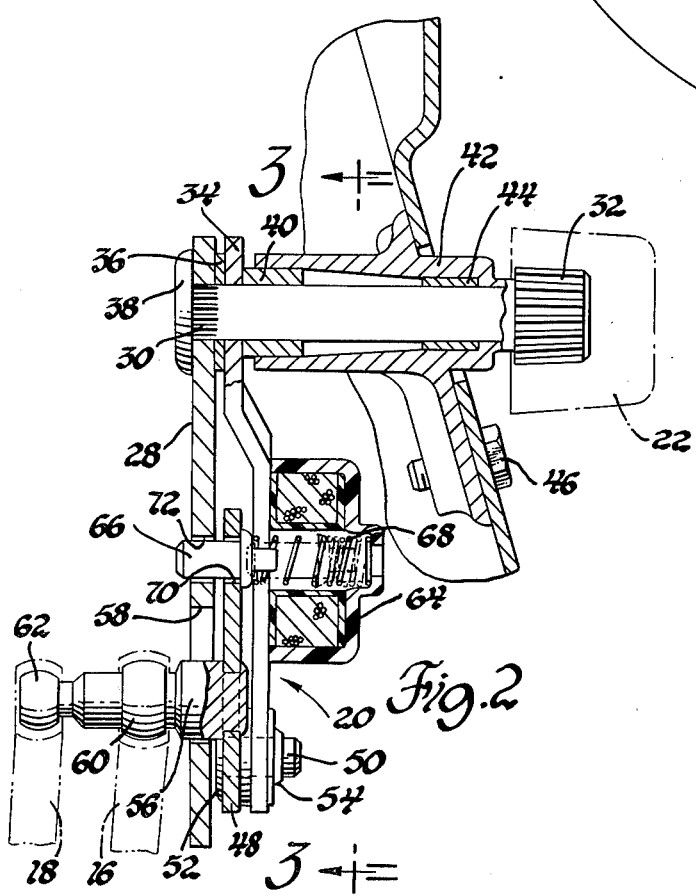
FIG. 2 is a sectional view taken along line 2—2 of FIG. 1.

In FIG. 2, the park linkage 20 is shown in detail and includes a drive link 28 which is secured to a wiper drive shaft 30. The wiper drive shaft 30 has a knurled end 32 to which is drivingly connected the wiper arm 22. The drive shaft 30 has rotatably mounted thereon an idler link 34 which is separated from the drive link 28 by a bearing washer 36. The head end 38 of wiper shaft 30 is upset to trap the drive link 28 and control link 34 between the head end 38 and a bearing 40 which is pressed into the housing 42. A bearing 44 is also pressed into the housing 42 and these two bearings 40 and 44 rotatably support the drive shaft 30 to permit substantially free oscillation of the wiper shaft during operation of the windshield wiper. The housing 42 is secured to the vehicle through one or more fasteners 46.

The linkage 20 also includes a control link 48 which is pivotally connected to the idler link 34 through a pin 50 which has an upset head 52 and a fastener 54 which maintains the two links 48 and 34 in proper alignment. A drive member 56 is secured to the control link 48. The drive member 56 passes through a slot 58 formed in the drive link 28 and the drive member 56 has formed thereon a pair of spherical surfaces 60 and 62. These spherical surfaces 60 and 62 are adapted to receive transmission links 16 and 18 respectively.

A solenoid 64 is mounted on the idler link 34 and is operable to cause a pin 66 to be drawn into the center of the core when energized. When the solenoid is de-energized, the pin 66 is urged by a spring 68 to pass through apertures 70 and 72 formed in the control link 48 and drive link 28, respectively. Thus the pin 66 provides a selective drive connection between the two links. When the solenoid 64 is energized the pin is withdrawn from both links 48 and 28 such that they are free to move relative to each other to the extent permitted by the drive member 56 and slot 58. It will be obvious to those skilled in the art, that solenoid 64 and pin 66 can be mounted on either link 28 or 48 instead of link 34. If the solenoid is mounted on either of these links (i.e., 28), the pin would only have to be withdrawn from the aperture in the link (i.e., 70 in 48), to permit the relative movement in the linkage 20 which is occasioned during parking of the wipers.

Figure 3:
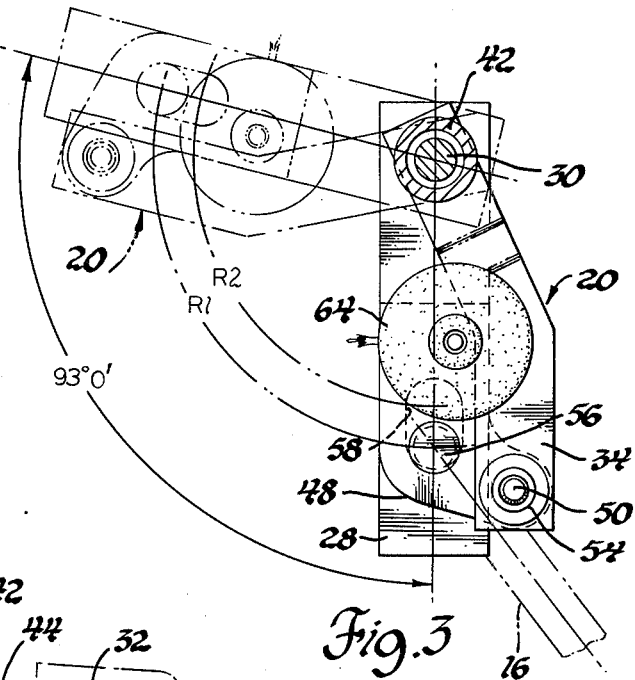
FIG. 3 is a top view, partly in section, taken along line 3—3 of FIG. 2 and showing the extreme positions of the linkage during wipe.
Figure 4:
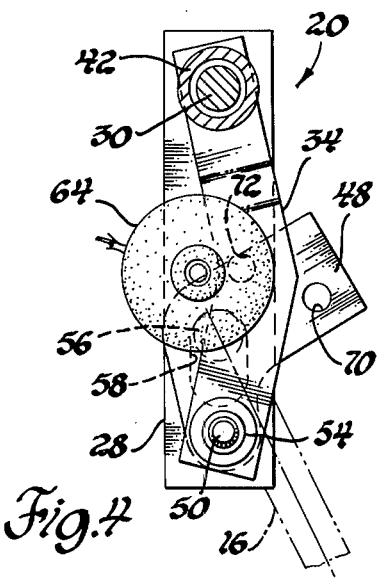
FIG. 4 is a view similar to FIG. 3 showing the linkage in the park position.

As can be seen in FIG. 3, when the pin 66 is drivingly connected in apertures 70 and 72 the drive member 56 driven by link 16 traverses the arc R1 about the axis of shaft 30. When the pin 66 is withdrawn from the apertures 70 and 72, the force on transmission link 16 causes the drive member 56 to move laterally in the slot 58 from the end position shown in FIGS. 2 and 3 to the end position shown in FIG. 4 such that drive member 56 is at radius R2 from the axis of wiper shaft 30. During parking motion, the radius on which the drive member 56 is operable is radius R2. As determined by the length of transmission link 16 and slot 58, the linkage mechanism 20 will traverse a greater arc when the drive member 56 operates on radius R2 thereby providing the extra amount of arcuate motion necessary for the parking maneuver.

As seen in FIG. 3, the wipe angle when the drive member is on radius R1, is 93°. The linkage 20, when permitted to assume the relative positioning shown in FIG. 4, enforces an additional arcuate motion thereby moving the windshield drive arms 22 and 26 sufficiently off the glass surface to permit unobstructed vision of the operator. When the windshield wipers are energized to move from the park position to normal wipe operation, the transmission link 16 will cause clockwise motion of the linkage 20 about the drive shaft 30. During this clockwise motion the force in link 16 will be in a direction such that the drive link 28 and control link 48 will be moved relative to the idler link 34 through the drive member and slot connection of 56 and 58. Thus as the wiper approaches its outer wiper position, as shown in phantom line in FIG. 3, the linkage will be moved from the relative position shown in FIG. 4 to the relative position shown in FIG. 3. At this time, the solenoid 64 is de-energized permitting the spring 68 to force the pin 66 into engagement with the apertures 70 and 72. Thus, as the motion of the transmission link is reversed during the normal wipe cycle, the relative position of the linkage 20 will be maintained as shown in FIG. 3 until it is desirable to again park the windshield wipers. During the parking maneuver, once the pin 66 has been withdrawn from the aperture 70, the spring 68 cannot force the pin to leave the core of solenoid 64 even if the solenoid is de-energized since the pin will engage the upper flat surface of link 48 and therefore cannot move to the left as shown in FIG. 2.

Obviously, many modifications and variations of the present invention are possible in light of the above teachings. It is therefore to be understood that within the scope of the appended claims the invention may be practiced otherwise than as specifically described.

What is claimed is:

1. A windshield wiper drive mechanism comprising: a drive motor; a transmission link operatively connected to said drive motor; a wiper drive shaft; and a parking linkage disposed between said transmission link and said wiper drive shaft including an idler link rotatably supported on said wiper drive shaft, a control link pivotally connected to said idler link, a drive member secured to said control link and being drivingly connected to said transmission link, a drive link drivingly connected to said wiper drive shaft and operatively drivingly connected to said control link through said drive member, and means for selectively connecting said drive link directly to said control link and disconnecting said drive link from said control link whereby said drive shaft, idler link, control link and drive link are oscillated in unison by said transmission link and drive motor through a predetermined arc about the axis of said drive shaft when said drive link and control link are selectively connected and said drive link and said drive shaft are driven through an additional arc about the axis of said drive shaft and angularly displaced relative to said idler link by said transmission link and drive motor when said drive link and said control link are selectively disconnected.

2. A windshield wiper drive mechanism comprising: a drive motor; a transmission link operatively connected to said drive motor; a wiper drive shaft; and a parking linkage disposed between said transmission link and said wiper drive shaft including an idler link rotatably supported on said wiper drive shaft, a control link pivotally connected to said idler link, a drive member secured to said control link and being drivingly connected to said transmission link, a drive link drivingly connected to said wiper drive shaft and having a slot formed therein for cooperating with said drive member to operatively drivingly connect the drive link to said control link, and solenoid means including a pin member for selectively connecting said drive link directly to said control link and disconnecting said drive link from said control link whereby said drive shaft, idler link, control link and drive link are oscillated in unison by said transmission link and drive motor through a predetermined arc about the axis of said drive shaft when said drive link and control link are selectively connected and said drive link and said drive shaft are driven through an additional arc about the axis of said drive shaft and angularly displaced relative to said idler link when said drive link and said control link are selectively disconnected.

3. A windshield wiper drive mechanism comprising: a drive motor; a transmission link operatively connected to said drive motor; a wiper drive shaft; and a parking linkage disposed between said transmission link and said wiper drive shaft including an idler link rotatably supported on said wiper drive shaft, a control link pivotally connected to said idler link and having an aperture formed therein, a drive member secured to said control link and being drivingly connected to said transmission link, a drive link drivingly connected to said wiper drive shaft having an aperture formed therein which aperture is alignable with the aperture in said control link and a slot formed therein through which slot the drive member passes thereby operatively drivingly connecting the control link and the drive link, and solenoid means including a spring loaded pin member said pin member being urged into said apertures when aligned and said solenoid withdrawing said pin member from said apertures thereby selectively connecting said drive link directly to said control link and disconnecting said drive link from said control link whereby said drive shaft, idler link, control link and drive link are oscillated in unison through a predetermined arc about the axis of said drive shaft when said drive link and control link are selectively connected and said drive link and said drive shaft are driven through an additional arc about the axis of said drive shaft and angularly displaced relative to said idler link when said drive link and said control link are selectively disconnected.

* * * * *